(12) United States Patent
Hoffmann et al.

(10) Patent No.: US 7,746,039 B2
(45) Date of Patent: Jun. 29, 2010

(54) METHOD FOR CONTROLLED APPLICATION OF A STATOR CURRENT SET POINT VALUE AND OF A TORQUE SET POINT VALUE FOR A CONVERTER-FED ROTATING-FIELD MACHINE

(75) Inventors: Frank Hoffmann, Höchstadt (DE); Franz Sperr, Adelsdorf (DE); Georg Stanke, Bubenreuth (DE)

(73) Assignee: Siemens Aktiengesellschaft, München (DE)

( * ) Notice: Subject to any disclaimer, the term of this patent is extended or adjusted under 35 U.S.C. 154(b) by 545 days.

(21) Appl. No.: 10/567,306

(22) PCT Filed: Jul. 15, 2004

(86) PCT No.: PCT/EP2004/007925

§ 371 (c)(1),
(2), (4) Date: Oct. 31, 2007

(87) PCT Pub. No.: WO2005/018086

PCT Pub. Date: Feb. 24, 2005

(65) Prior Publication Data

US 2008/0136380 A1    Jun. 12, 2008

(30) Foreign Application Priority Data

Aug. 6, 2003  (DE) ................................ 103 36 068

(51) Int. Cl.
*H02P 9/00* (2006.01)
(52) U.S. Cl. ............................. 322/89; 322/37; 318/800
(58) Field of Classification Search .................. 322/17, 322/24, 29, 37, 47, 89; 318/800, 804; 363/37
See application file for complete search history.

(56) References Cited

U.S. PATENT DOCUMENTS 4,006,399 A * 2/1977 Studtmann .................... 322/47

(Continued)

OTHER PUBLICATIONS

Horstmann D. et al.: "Die Stromrichternahe Antriebsregelung des Steuergerätes für Bahnautomatisierungssysteme SIBAS 32" [Controller drive control close to the converter for SIBAS 32 railroad automation systems], Elektrische Bahnen, Oldenbourg Verlag, Munich, Germany, vol. 90, No. 11, Nov. 1, 1992, pp. 344-350, XP000311285 ISSN: 0013-5437.

(Continued)

*Primary Examiner*—Nicholas Ponomarenko
(74) *Attorney, Agent, or Firm*—Henry M. Feiereisen; Ursula B. Day

(57) ABSTRACT

The invention relates to a method for the controlled application of a stator-current target value ($I_{Snom}$) and a torque target value ($M_{nom}$) for a polyphase machine (4) that is supplied by an electronic power converter. According to the invention: current components ($I_{Sdnom}$, $I_{Sqnom}$) in a co-ordinate system (d, q) with a fixed rotor flux or rotating magnetic pole are calculated in accordance with a torque target value and in asynchronous machines in accordance with a rotor-flux target value ($\psi_{Rnom}$), a calculated rotor-flux actual value ($\psi_R$) or a rotating magnetic-pole flux; a stator-circuit frequency ($\omega_S$) is determined; a terminal-flux target value ($\psi_{Knom}$) is calculated in accordance with the values ($I_{Snom}$, $I_{Sqnom}$, $\psi_R$, $\omega_S$) by means of the machine parameters (L, $R_S$), said terminal-flux target value being subsequently projected onto a flux-course curve, selected from stored, off-line optimised flux-course curves. This permits the state of the stator current ($I_S$) to be regulated in relation to the rotor flux ($\psi_R$) or rotating magnetic-pole flux by means of momentary values, facilitating a stationary and dynamic precise control of motor currents ($I_1, I_2, I_3$) and thus the torques (M) of a polyphase machine (4).

8 Claims, 13 Drawing Sheets

U.S. PATENT DOCUMENTS

| | | | | | |
|---|---|---|---|---|---|
| 4,593,240 | A | * | 6/1986 | Blaschke | 318/800 |
| 5,028,804 | A | * | 7/1991 | Lauw | 290/40 C |
| 5,225,712 | A | * | 7/1993 | Erdman | 290/44 |
| 5,280,419 | A | * | 1/1994 | Amler | 363/37 |
| 5,965,995 | A | * | 10/1999 | Seibel et al. | 318/805 |
| 6,433,506 | B1 | * | 8/2002 | Pavlov et al. | 318/804 |
| 6,498,452 | B1 | * | 12/2002 | Luukko | 318/700 |
| 6,720,748 | B1 | * | 4/2004 | Seibel et al. | 318/432 |
| 7,372,174 | B2 | * | 5/2008 | Jones et al. | 290/44 |

OTHER PUBLICATIONS

Jänicke M. et al.: "Direkte Selbstregelung, ein neuartiges Regelverfahren für Traktionsantriebe im Ersteinsatz bei dieselelektrischen Lokomotiven" [Direct self-regulation, a novel control method for traction drives used for the first time in diesel-electric locomotives], Elektrische Bahnen, Oldenbourg Verlag, Munich, Germany, vol. 89, No. 3, Mar. 1991, pp. 79-87, XP000200273 ISSN: 0013-5437.

Baader U. et al.: "Direct Self Control (DSC) of Inverter-Fed Induction Machine: A Basis for Speed Control without Speed Measurement", May 1, 1992, IEEE Transactions on Industry Applications, IEEE Inc. New York, US, pp. 581-588, XP000306107 ISSN: 0093-9994.

A.M. Llor et al.: "Direct Stator Flux Linkage Control Technique for a Permanent Magnet Synchronous Machine" in Power Electronics Specialist, 2003, PESC '03, IEEE 34$^{th}$ Annual Conference on, vol. 1, Jun. 15-19, 2003, pp. 246-250.

"Direkte Selbstregelung (DSR) für hochdynamische Drehfeldantriebe mit Stromrichterspeisung" [Direct self-regulation (DSR) for highly dynamic rotating field drives with a converter feed], M. Depenbrock*, etzArchiv, vol. 7 (1985), Issue 7, pp. 211 to 218.

"Direkte Drehmomentregelung von Drehstromantrieben" [Direct torque control for three-phase drives], ABB Technik, No. 3, 1995, pp. 19 to 24.

* cited by examiner

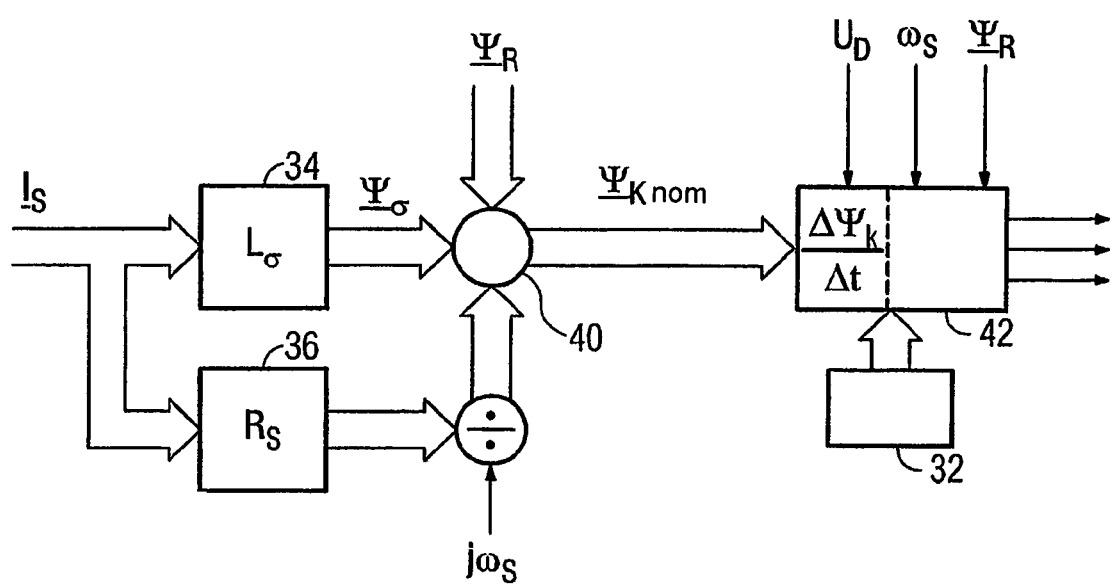

METHOD FOR CONTROLLED APPLICATION OF A STATOR CURRENT SET POINT VALUE AND OF A TORQUE SET POINT VALUE FOR A CONVERTER-FED ROTATING-FIELD MACHINE

BACKGROUND OF THE INVENTION

The invention relates to a method for controlled application of a stator current set point value and of a torque set point value for a converter-fed rotating-field machine.

Pulse-controlled inverters with a constant input voltage are frequently used in conjunction with a field-oriented control method in order to feed rotating-field machines whose torque can be varied in a highly dynamic form to desired values within a wide rotation speed range. A drive system such as this is normally also adequate to satisfy very stringent technical demands for the control quality. Subject to the precondition of terminal currents which can be applied in any desired manner, the magnetic flux and the torque of a rotating-field machine can in principle be set continuously variably to desired values, although only if all of the electromagnetic system parameters of a sufficiently accurate description model of the machine are known. The associated terminal voltages can then be determined continuously with the aid of a single processing system—on the basis of the measurement variables of the terminal currents and the rotation speed—as a function of a nominal variable, for example for the torque. If the dynamic requirements for the control of the rotating-field machine are particularly stringent, the pulse repetition frequency must likewise be made high. This has a disadvantageous effect on the efficiency and the costs of the inverter.

Traction converters for rail vehicles do not allow high switching frequencies to be used, because of the high power density and the efficiency requirements. For example, the switching frequency in the voltage adjustment range is only in the range from 300 Hz-800 Hz for locomotives, prime movers and heavy short-distance trains and 800 Hz-2 kHz for light short-distance traffic. In addition, the available intermediate-circuit voltage must be used optimally, that is to say no voltage margin may be demanded, for control reasons. In order to avoid unacceptable network reactions, the steady-state harmonic spectrum must be defined and it must be possible to influence it. Together with the restricted switching frequency and the maximum drive capability, this requires synchronous clocking methods for the pulse-controlled inverter.

The dynamic requirements for traction converters are likewise stringent. Both the disturbance response, for example in the case of sudden overhead line voltage changes, and the drive response, for example the desired high torque dynamic range, in order to cope with sliding and skidding processes, as well as mechanical drive oscillations, must be highly dynamic in comparison to normal steady-state drives.

Furthermore, the projected maximum current load on the converter must be maintained precisely, in order to avoid overdesign of the power section. It must still be possible to apply the predetermined current by means of the control method even in the event of disturbance and reference variable changes.

A control method is therefore required in which the stator current is applied. This at the same time allows an optimum steady-state and dynamic response for presetting the torque.

Accurate and highly dynamic control of the stator current has not been possible directly until now because of the considerable harmonics caused by the clocking process and because the machine parameters (straight inductance and main inductance) are highly non-linear for harmonics.

The publication "Die stromrichternahe Antriebsregelung des Steuergerätes für Bahnautomatisierungssysteme SIBAS 32" [Controller drive control close to the converter for SIBAS 32 railroad automation systems], printed in the German Journal "eb—Elektrische Bahnen" [Electric railroads], Volume 90 (1992), Issue 11, pages 344 to 350, discloses asynchronous machine drive control close to the converter based on the field-orientation method with the major functions of measured value detection, flux model, control structure and triggering equipment.

Analogue measurement variables must be recorded for drive control based on the proven method of field orientation. Two machine currents and the input voltage of the pulse-control inverter, also referred to as the intermediate-circuit voltage, are measured. In one variant, two conductor voltages are also measured. The motor rotation speed is recorded as a further measurement variable. If an inverter is feeding two parallel-connected traction motors, then both motor rotation speeds are recorded, and the arithmetic mean value is used for control purposes.

Field-oriented control is based on knowledge of the magnitude and angle of the rotor flux. Since these variables cannot be measured directly, computer models are generally used which simulate the internal structure of the asynchronous machine. A flux model is used in order to determine the rotor flux from the measured actual values of the voltage, current and the rotation speed. This comprises two known model elements of the asynchronous machine, specifically the voltage model and the current model. At low rotation speeds, the influence of the current model dominates while, in contrast, that of the voltage model dominates at higher rotation speeds. The structure that is used thus combines the advantages of both model elements, and can be regarded as a voltage model guided by the current model. The current model includes the rotor time constant as a parameter. During operation, the rotor impedance of the machine varies to a major extent with the rotor temperature. Knowledge of the instantaneous rotor impedance is accordingly necessary for the current model to work accurately.

The central object of the signal processing system is to drive the pulse-control inverter such that the traction motor follows the required set point values. The two conductor voltages as well as the three machine currents are converted to two orthogonal components in coordinate converters. The two orthogonal current components are now converted, using the flux angle, from the stator-fixed coordinate system to a system which revolves with the rotor flux space vector, that is to say the field orientation of the current components. After filtering, the actual values of the field-forming current component and of the torque-forming current component are then produced. These current components are identical parameters at a steady-state operating point.

In order now to determine the control output variables from the nominal flux and nominal torque as reference variables, the inverse structure of the asynchronous machine is normally modeled using a so-called decoupling circuit. This calculates the required voltage components from the flux set point value, from the magnetization current set point value taken from the magnetization characteristics, from the real current set point value and from the angular velocity of the rotor flux. Two current regulators are added to the outputs of the decoupling circuit for stabilization, for the field-forming current component and the torque-forming current component.

The triggering equipment is used to match the control system to the instantaneous intermediate-circuit voltage. The drive level for the pulse width modulator is calculated from the nominal voltage and the actual value of the intermediate-circuit voltage. The task of the triggering equipment is to produce the required voltage fundamental, whose frequency and amplitude are variable, at the motor by alternate switching of the three inverter branch pairs.

The switching times are calculated using two different modulation methods, depending on the operating mode. When the frequencies and voltages are low in the starting and slow speed range, asynchronous sinusoidal modulation is used. Since a large number of switching operations in this case occur in one period of the fundamental frequency, the switching vectors and the switching angles associated with them must be determined on-line by the processor. When the ratio of the switching frequency to the fundamental frequency, the so-called pulse count, reaches a value of about 10 to 8, the inverter must be clocked in synchronism with the fundamental frequency. As the fundamental frequency rises, the limited switching frequency of the inverter means that the pulse count must be reduced in steps. Pulse patterns that have been optimized off-line are used in this case. The most important optimization criterion is the root mean square value of the harmonic current since this is the main cause of the additional losses in the motor as a result of the converter feed.

The pulse pattern must therefore be selected as a second step after optimization. In this case, a family of characteristics is created for selection of the suitable pulse system for the processor, in which the most suitable pulse pattern which satisfies the constraints of the maximum switching frequency and maintenance of the minimum pulse width and of the maximum peak current value is entered for all possible discrete values of the fundamental frequency and drive level. The pulse pattern selection level, as well as the pulse angles which have been optimized for each pulse system and for each drive level off-line, are stored in table form in the signal processor unit. The modulation type and the pulse system which is also associated with the operating point required by the control system are first of all determined from the selection level in the program model triggering equipment. The switching times in the area of the optimized patterns can be calculated as a function of the instantaneous stator frequency from the switching angles stored for the relevant drive level. In the event of pulse system changes, the times must be chosen such that no equalization processes or undesirable current spikes occur.

This so-called voltage triggering equipment allows the manipulated variable of the voltage to be predetermined just by the magnitude and angle of the fundamental, with the instantaneous values of the other electrical variables then being predetermined by the pulse pattern, such that they can no longer be influenced on-line. If the dynamics of the manipulated variable are excessive, equalization processes occur which lead to excessive torque oscillations.

The publication "Direkte Selbstregelung (DSR) für hochdynamische Drehfeldantriebe mit Stromrichterspeisung" [Direct self-regulation (DSR) for highly dynamic rotating field drives with a converter feed], printed in the German Journal "etzArchiv", Volume 7 (1985), Issue 7, pages 211 to 218, describes direct self-regulation of a converter-fed asynchronous machine which operates without pulse width modulation, has little sensitivity to parameters and, in addition, has very good dynamic characteristics. When a rotating-field machine is being fed with a constant input voltage via a three-phase inverter, the space vector of the stator voltage can assume only seven discrete values. Ignoring the voltage which is dropped across the copper resistances of the stator windings and which is generally small in comparison to the stator voltage in the field weakening range, then the respective instantaneous value of the voltage space vector is the only factor determining the change in the velocity and the direction of the instantaneous position of the space vector for the overall flux. When the fundamental frequency clocking is in the steady state, the peak of the flux space vector therefore passes through an equilateral hexagon with a constant path velocity and with a slightly pulsating angular velocity.

In the case of fundamental frequency clocking, the only possible way to influence the torque of the asynchronous machine is to control the time intervals between the switching operations of the voltage space vector. Ignoring the voltages across the copper resistance of the stator windings (which are proportional to the current), the path velocity can very easily be reduced to the value zero in a three-phase inverter with a constant input DC voltage, specifically by connection of the seventh machine voltage space vector, whose magnitude has the value zero. As is known, any desired intermediate value of the path velocity, averaged for the pulse period, can be set by the choice of the duration of the two interval elements by using a pulse period comprising a first interval element in which the path velocity of the flux space vector is not reduced, and a second interval in which the flux space vector is stationary with respect to the stator axes.

The signal processing for direct flux self-regulation has a flux comparator and a torque comparator. An integrator is used to generate orthogonal components of the stator flux from the measured voltage values reduced by the voltage drop across the copper resistances of the stator windings in the asynchronous machine, and these components are converted to flux variables for each stator winding axis of the asynchronous machine. Each of these flux variables is compared with a flux reference variable, which can be derived from the torque control. This then results in very simple control in the basis rotation speed range in accordance with the following rule:

If the instantaneous value of the torque exceeds the set point value by more than a permissible tolerance, then the seventh space vector value whose magnitude is zero shall be applied instead of the instantaneous space vector value as determined by the flux self-regulation from the sixth outer space vector values of the machine voltage, until the actual value of the torque is below the set point value by more than the permissible tolerance. After this, the flux self-regulation once again determines the switching state of the inverter. The seventh voltage space vector value, whose magnitude is zero, can be produced, as is known, by two different switching states. Secondary conditions can be satisfied by means of appropriate selection criteria, for example the minimum switching frequency, and ensuring switching state minimum times.

This described procedure results in the angular velocity of the rotating component of the resultant flux linking, averaged over one pulse period, being automatically set to the value required to produce the desired torque, to be precise without any information about the shaft rotation speed or about instantaneous values of inductances, rotor impedance or other variables and parameters which must be known for a field-oriented control method. The slow and fast fluctuations in the input DC voltage to the inverter, which are generally always present, are taken into account automatically by the direct self-regulation, and thus have no effect on the torque, which is maintained in a predetermined tolerance band.

This direct self-regulation is suitable for a traction drive and results in an optimum dynamic response, although not in a reproducible steady-state response. Furthermore, this direct self-regulation does not permit an excessively low ratio of the switching frequency to the fundamental frequency.

The publication "Direkte Drehmomentregelung von Drehstromantrieben" [Direct torque control for three-phase drives], printed in the German Journal "ABB Technik", No. 3, 1995, pages 19 to 24, describes newly developed direct torque control. This direct torque control [DTC] is based on the theories of field-oriented control of asynchronous machines and of direct self-regulation. In the case of direct torque control, the motor and the inverter are largely integrated. All of the switching processes of the converter are dependent on the electromagnetic state of the motor. As in the case of direct-current machines, DTC allows the flux and torque to be controlled separately. There is no need for pulse-width modulation between the motor and the inverter control.

The core units of the DTC system are the units for hysteresis control of the torque and magnetic flux as well as the logic unit for switching optimization. Another important component of the system is the accurate motor model. By means of measurements of two motor currents and of the voltage in the DC intermediate circuit, the motor model produces actual value signals for the torque, stator flux, frequency and shaft rotation speed. The set point values for the torque and flux are compared with the actual values, and the control signals are produced by two-point control of the hysteresis. The switching optimization logic determines the best voltage vector on the basis of the set point values for the torque and flux. The stator flux is controlled via the output voltage of the inverter. In the case of DTC, the stator flux and torque are kept within the hysteresis limit, that is to say within the selected tolerance band. The state set point values are changed only when the actual values of the torque and stator flux differ from their set point values by more than the permissible hysteresis. If the rotating stator flux vector reaches the upper or lower hysteresis limit, a suitable voltage vector is used to change the direction of the stator flux, and thus to keep it within the hysteresis band. The required torque is achieved by stator flux vector control.

This direct torque control also results in an optimum dynamic response, in the same way as direct self-regulation. However, the steady-state response is not reproducible, and this direct torque control does not allow an excessively low ratio of the switching frequency to the fundamental frequency, either.

The publication "Direkte Selbstregelung, ein neuartiges Regelverfahren für Traktionsantriebe im Ersteinsatz bei dieselelektrischen Lokomotiven" [Direct self-regulation, a novel control method for traction drives used for the first time in diesel-electric locomotives], printed in the German Journal "eb—Elektrische Bahnen" [Electric railroads], Volume 89, (1991), Issue 3, pages 79 to 87, describes one implementation for direct self-regulation (DSR).

SUMMARY OF THE INVENTION

The invention is now based on the object of specifying a method for controlled application of a stator current set point value and of a torque set point value, which avoids the disadvantages of the known methods, and allows the field of use to be extended to synchronous machines.

According to the invention, this object is achieved by a method for controlled application of a stator current set point value and of a torque set point value for a converter-fed rotating-field machine, with a field-forming current component of the stator current set point value being calculated as a function of a predetermined rotor flux set point value and of a determined rotor flux actual value, and with a torque-forming current component of the stator current set point value being calculated as a function of a predetermined torque set point value, of the determined rotor flux actual value and of a determined torque-forming current component of a measured stator current, with a stator angular frequency actual value being determined as a function of a determined rotor slip frequency and of an angular frequency ($\omega$) and with the integral of the stator voltage being calculated as a manipulated variable from these calculated values as a function of the parameters comprising the frequency-dependent stray inductance and the stator resistance, from which integral a flux path curve is derived, which is selected from stored off-line optimized flux path curves.

This method according to the invention combines field-oriented control with voltage time-integral triggering equipment for off-line optimized pulse patterns. This means that integrals of the stator voltage, that is to say voltage time integrals, are now predetermined as a manipulated variable, rather than the stator voltage itself. Since these voltage time integrals have the dimension of a flux, this voltage time integral is more clearly regarded as a terminal flux. Voltage triggering equipment this becomes voltage time-integral triggering equipment, by means of which a selected flux path curve can be readjusted accurately both in the steady state and dynamically in order in this way to set the position of a determined terminal flux with respect to the rotor flux of a rotating-field machine both in terms of its magnitude and its angle, directly with every possible switching operation, from voltage triggering equipment. Thus, in the steady state, the stator flux and hence the torque, which is governed by the position of the stator flux with respect to the rotor flux, are also applied on the basis of initial control by means of the terminal flux, which is exact in the steady state. Furthermore, this initial control of the terminal flux means that the stator current is applied indirectly, thus avoiding the disadvantages of direct current control.

Since, in the case of synchronous clocking, continuous differentiation of the flux with respect to the voltage over time in order to achieve initial control which is correct in the steady state and dynamically is not possible, this is moved on the basis of knowledge of this invention to the time-discrete, pulse-synchronous triggering equipment. The input variable to the triggering equipment is then no longer the voltage but its integral over time, which corresponds to a voltage time integral which is intended to be implemented by the triggering equipment in the respective discrete sampling interval. The shifting of the differentiation of the terminal flux to the triggering equipment means that further changes are required in the handling and outputting of the optimized pulse patterns in the triggering equipment.

In one advantageous method, the terminal flux is determined via a circuitous route by calculation of the steady-state stator voltage. This at the same time results in a drive level which can be used for the choice of a pulse pattern. In the field weakening region, the drive level must be limited, and this can now be carried out by means of the circuitous route via the stator voltage.

In a further advantageous method, an actual value of the terminal flux is determined and is used for dynamically carrying a determined terminal flux on a chosen flux band curve. This largely compensates for discrepancies which can result in equalization processes. The dynamic discrepancy from the stator flux is thus shifted to the terminal flux, so that a torque set point value can also be applied dynamically. The application of a torque set point value results in the position of the stator flux with respect to the rotor flux being applied exactly, so that the stator current is also defined. A set point value of a stator current is thus likewise indirectly applied, dynamically.

BRIEF DESCRIPTION OF THE DRAWING

In order to explain the invention further, reference is made to the drawing in which the method according to the invention is illustrated schematically.

FIG. 6 shows a structure for initial control for voltage time-integral triggering equipment.

DETAILED DESCRIPTION OF PREFERRED EMBODIMENTS

In order to ensure clarity, the method according to the invention will be described in the following text using the example of an asynchronous machine.

Figure 1:
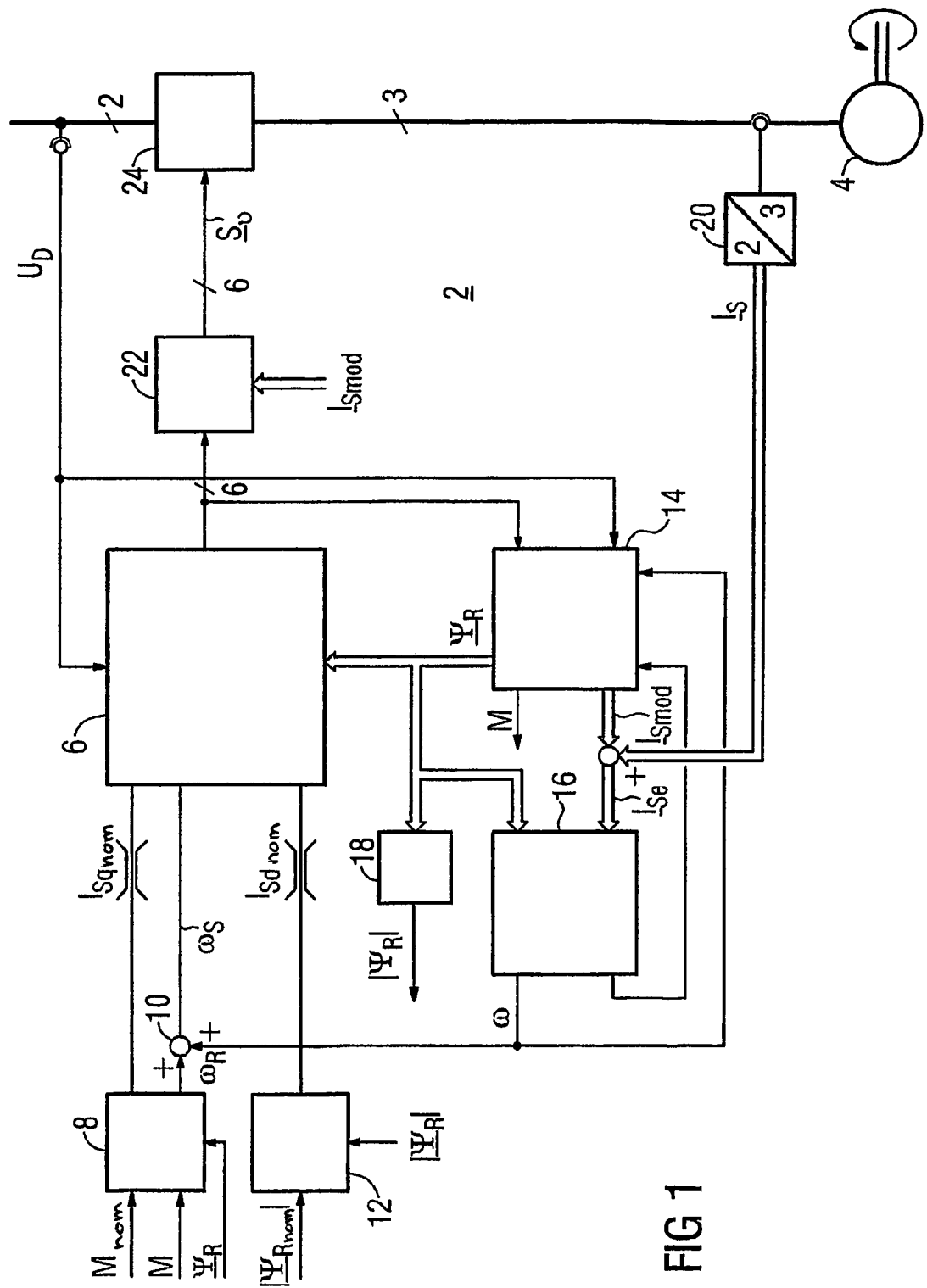
FIG. 1 shows a structure for overall drive control for a rotating-field machine without any rotation speed sensor.

FIG. 1 shows a structure of the overall drive control 2 for a rotating-field machine 4 without a rotation speed sensor. The device 6, in particular a microprocessor, is responsible for carrying out a major proportion of the method according to the invention. A voltage time integral, which in this case is referred to as the terminal flux $\psi_{Knom}$, is in this case calculated as a manipulated variable by means of this device 6 from determined current components $I_{Sqnom}$ and $I_{Sdnom}$ and a determined stator rotation frequency $\omega_S$. The torque-forming current component $I_{Sqnom}$ of a stator current set point value $I_{Snom}$ to be applied is calculated by means of a torque controller 8 as a function of a torque set point value $M_{nom}$, a determined rotor flux actual value $\psi_R$ and a torque actual value M. In addition, a rotor slip frequency $\omega_R$ is produced at the frequency output of this torque controller 8 and is linked by means of an adder 10 to a calculated angular frequency $\omega$, which is proportional to the mechanical rotation speed of the rotating-field machine 4. A flux controller 12 is provided in order to determine the flux-forming current component $I_{Sdnom}$ of the stator current set point value $I_{Snom}$ to be applied. A predetermined rotor flux set point value $\psi_{Rnom}$ and a determined rotor flux actual value $\psi_R$ are applied to its inputs. These two current components $I_{Sdnom}$ and $I_{Snom}$ are components of a coordinate system d, q which is fixed to the rotor flux. The torque and flux controllers 8 and 12 are adequately known from field-oriented control. Furthermore, the further devices 14, 16 and 18 are known from field-oriented control. 14 denotes a motor model, 16 denotes rotation speed and parameter adaptation, and 18 denotes a magnitude forming device. The device 16 calculates a rotation speed value and parameter values for the rotating-field machine 4, such as the stator resistance $R_S$, the stray inductance $L_\sigma$ and the main inductance $L_h$. A rotor flux actual value $\psi_R$ on the one hand and a stator current difference $\underline{I}_{Se}$ on the other hand, comprising a stator current model value $\underline{I}_{Smot}$ and a stator current actual value $\underline{I}_s$ which is present at the output of a coordinate converter 20, are used for this purpose. The stator current model value $\underline{I}_{Smot}$ is produced by the device 14, which generates a rotor flux $\psi_R$ and a torque actual value M. This device 14 requires at least the parameters and the determined rotation speed actual value $\omega$ for this purpose. 22 denotes an inverse inverter model, to which the stator current model value $\underline{I}_{Smot}$ is supplied. Control signals $S_V$ for a load-side converter 24, in particular a pulse-controlled inverter, are produced on the output side of the inverse inverter model 22, with the pulse-controlled inverter feeding the rotating-field machine 4. An asynchronous machine or a synchronous machine may be used as the rotating-field machine 4.

Figure 2:
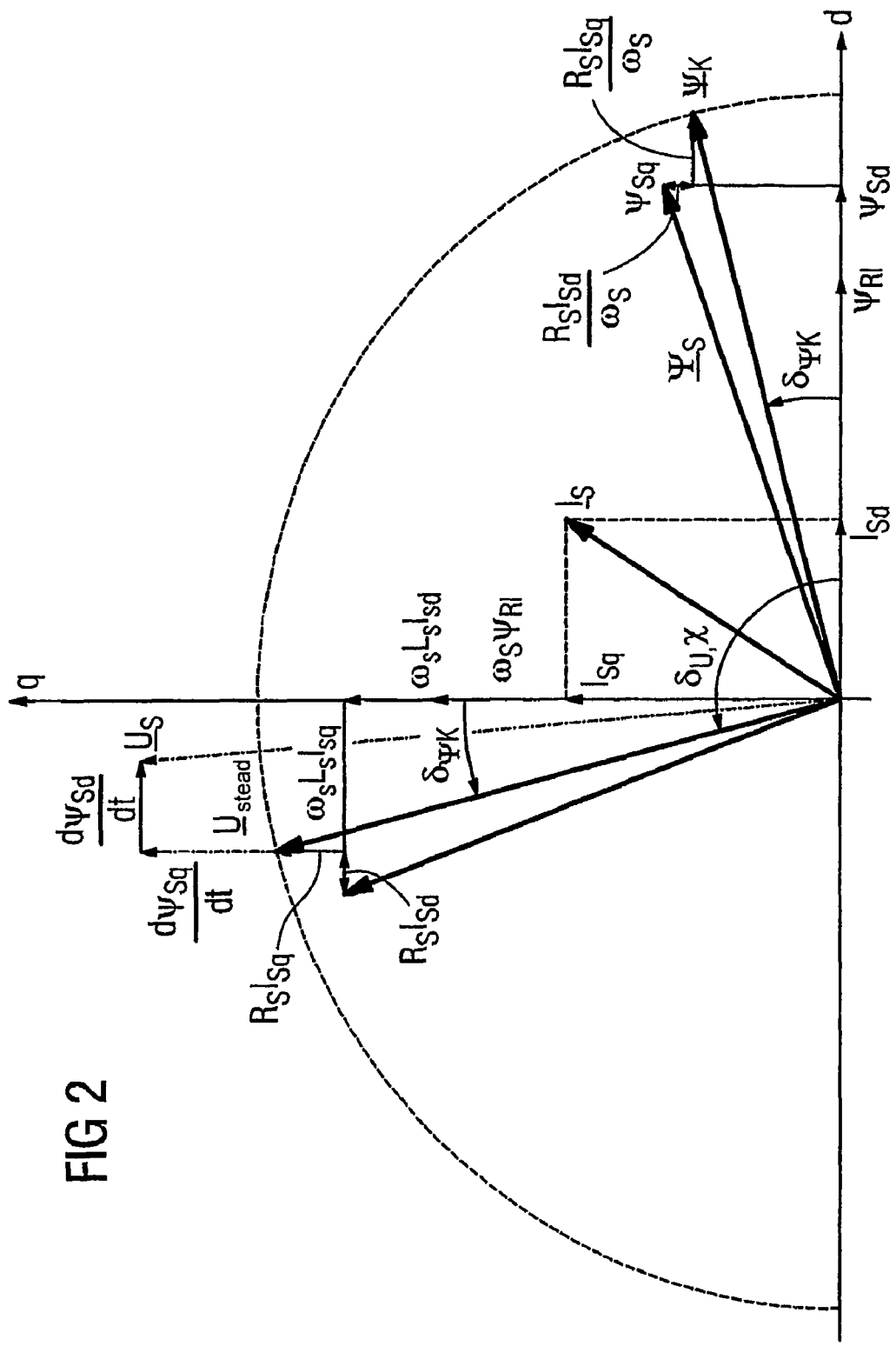
FIG. 2 shows a vector diagram of an asynchronous machine using a coordinate system which is fixed to the rotor flux.

By way of example, FIG. 2 shows a vector diagram of an asynchronous machine using a coordinate system d, q which is fixed to the rotor flux. As normal, this vector diagram shows the stator voltage vector $\underline{U}_s$ for the steady state and for the dynamic state. The stator current vector $\underline{I}_s$ is likewise shown, with its orthogonal current components $I_{Sd}$ and $I_{Sq}$. New items illustrated in this known vector diagram are the flux vectors $\psi_K$ and $\psi_S$. The flux vector $\psi_K$ corresponds to the stator voltage vector $\underline{U}_{Sstead}$ rotated through 90°. This flux vector $\psi_K$ is thus the integral of the stator voltage vector $\underline{U}_{Sstead}$ and is referred to as the terminal flux vector $\psi_K$. This terminal flux vector $\psi_K$ corresponds to the vectorial addition of the stator flux vector $\psi_S$ and a flux vector which corresponds to the voltage drop across the stator resistance $R_S$.

Figure 3:
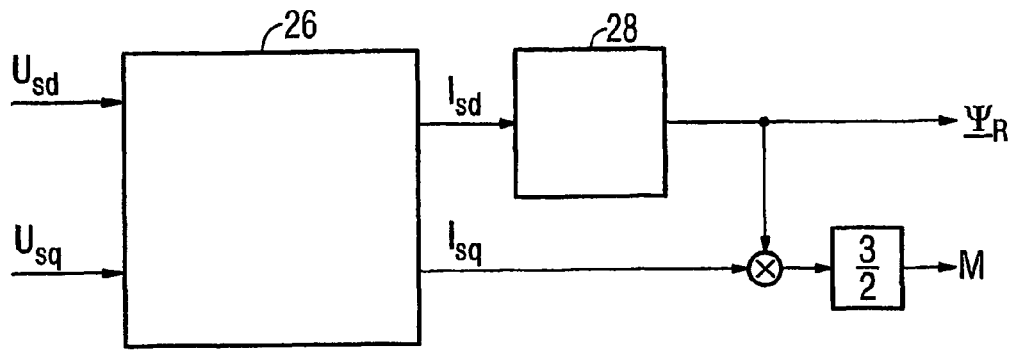
FIG. 3 shows a control path, illustrated in simplified form, of an asynchronous machine.

Initial control which is correct in the steady state and dynamically must reflect the inverse of the structure of the control path in order to compensate for its steady-state and dynamic response. In principle, FIG. 3 shows the subdivision of the structure of a rotating-field machine, in particular of an asynchronous machine, with the rapidly changing electrical variables of the stator mesh 26 and the electrical variables of the rotor mesh 28, which can change only slowly. The initial control and control of the rotor flux $\psi_R$ and of the torque M (only the torque for a synchronous machine with permanent-magnet excitation) can be subdivided into the slow initial control and control of the rotor flux $\psi_R$ and the highly dynamic initial control and control of the current components $I_{Sd}$ and $I_{Sq}$ which form the field and torque. In the case of the method according to the invention, only the initial control and control of the current components $I_{Sd}$ and $I_{Sq}$ via the stator mesh 26 are of interest. In principle, only the stator mesh 26 exists for a synchronous machine with permanent-magnet excitation.

Figure 4:
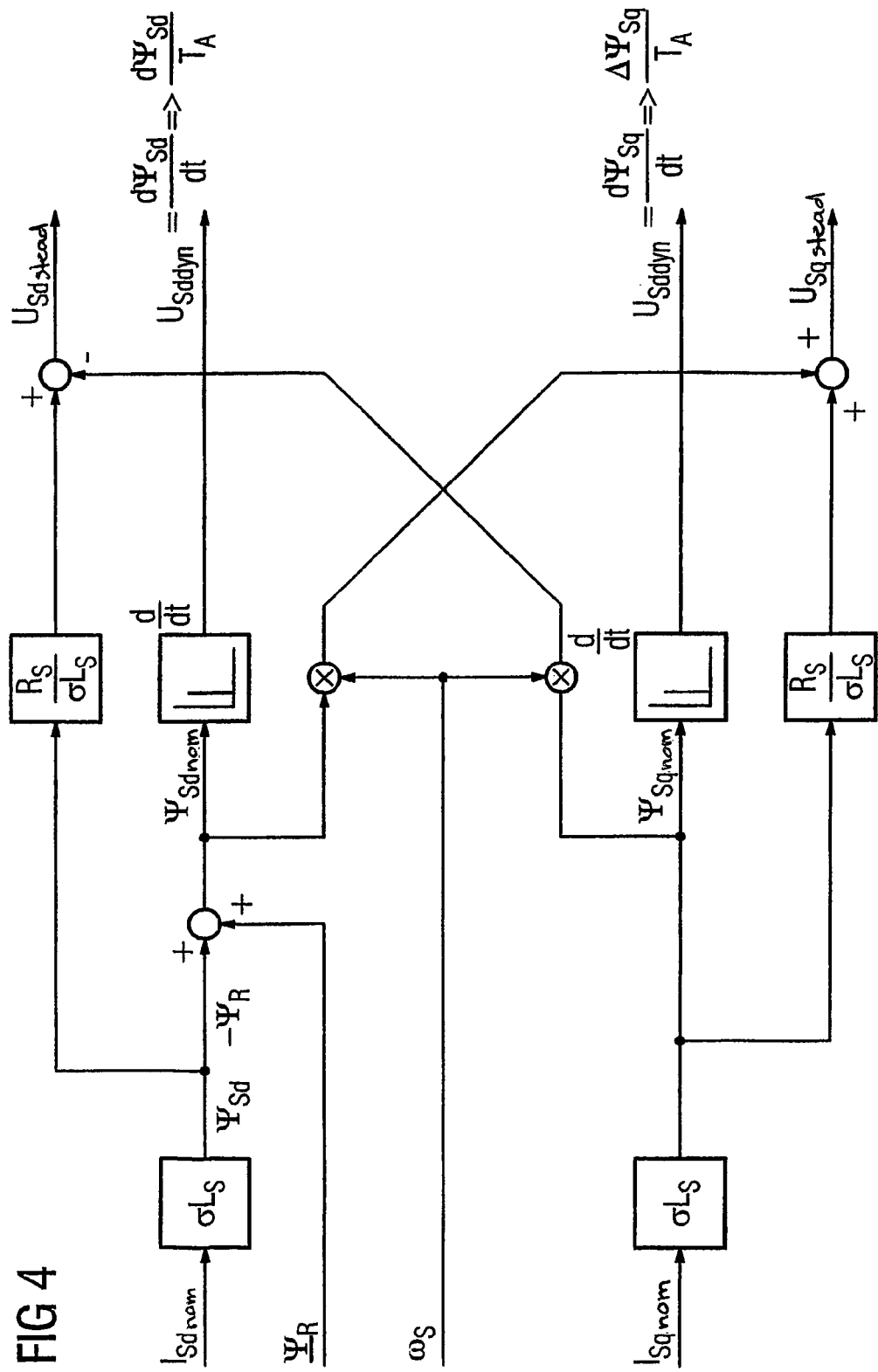
FIG. 4 shows voltage initial control for an asynchronous machine on a rotor-flux oriented basis.

FIG. 4 shows the required structure for initial control of the stator mesh 26. In this case, the voltage components $U_{Sd}$ and $U_{Sq}$ are subdivided into steady-state and dynamic components $U_{Sdstead}$, $U_{Sqstead}$ and $U_{Sddyn}$, $U_{Sqdyn}$. Since this structure for initial control is self-explanatory to a person skilled in the art, it will not be described in any more detail at this point. The problems with this voltage initial control result from the dynamic voltage components $U_{Sddyn}$ and $U_{Sqdyn}$, which must be determined from the difference of the stator flux set point value $\psi_{Sdnom}$ and $\psi_{Sqnom}$.

Figure 5:
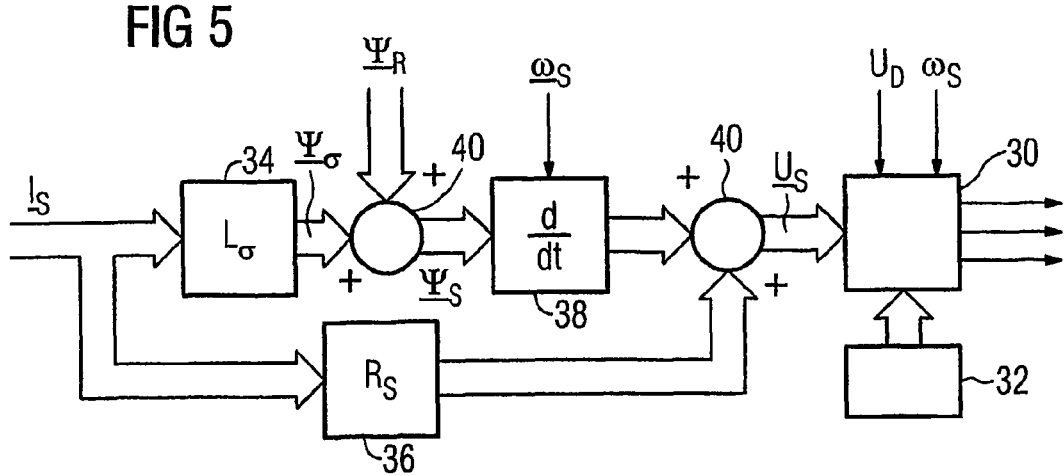
FIG. 5 shows a structure for initial control of voltage triggering equipment while, in contrast.

This structure illustrated in FIG. 4 for initial control of the stator voltage $\underline{U}_s$ can be extended by means of voltage triggering equipment to form a complete structure for initial control. One such structure is illustrated schematically in FIG. 5. Triggering equipment 30 is used for matching to an instantaneous intermediate-circuit voltage $U_D$ and for reverse transformation from a coordinate system that is synchronized to the flux to a coordinate system that is fixed to the stator in order to emit switching times. In this structure for initial control for voltage triggering equipment, 32 denotes a pulse pattern table with optimized pulse patterns, 34 denotes the stray inductance La parameter, 36 denotes the stator resistance $R_S$ parameter, 38 denotes a differentiation device, and 40 in each case denotes an addition point. The frequency relationship, specifically the reduction at higher frequencies, in the stray inductance $L_\sigma$ parameter must be taken into account for dynamically exact initial control. According to this structure, the intermediate variable comprising the stator flux $\psi_S$, which results from the rotor flux $\psi_R$ and the stray flux $\psi_\sigma$, caused by the stator current $\underline{I}_S$, is differentiated in order to obtain the stator voltage $\underline{U}_S$. This can be done without any problems for asynchronous modulation, since every possible voltage vector $\underline{U}_S$ can be set as a mean value in one switching cycle.

The dynamic component of the differentiation of the flux changes cannot be taken into account sufficiently quickly for synchronous pulse patterns, since the time discretization by means of the pulse patterns is too coarse for quasi-continuous handling. This can be explained by the fact that the switching sequence of the voltage space vectors is defined in a fixed form for synchronous clocking. The magnitude and angle of the voltage therefore cannot be influenced without restrictions, so that the differentiation of the stator flux $\psi_s$ cannot be converted to the desired stator voltage space vector $\underline{U}_S$. This means that the initial control can be implemented only in the steady state for optimized pulse patterns.

Since, in the case of synchronous clocking, continuous differentiation of the flux over time with respect to the voltage is not possible in order to achieve initial control that is correct in the steady state and dynamically, this is moved according to the invention to time-discrete, pulse-synchronous triggering equipment. The input variable for associated triggering equipment is then no longer the stator voltage $\underline{U}_S$ but its integral over time, that is to say a voltage time integral which must be provided by triggering equipment 42 in the respective discrete sampling interval. The structure of the initial control for triggering equipment 42 which has to implement voltage time integrals is illustrated schematically in FIG. 6. Since the dimension of voltage time integrals corresponds to a flux, these voltage time integrals are referred to in the following text as the terminal flux $\psi_K$. The time-discrete differentiation of the terminal flux $\psi_K$ in the triggering equipment 42 must, of course, be carried out after the reverse transformation to the coordinate system that is fixed to the stator. The determination of the switching-on and off times of the discrete voltage states on the basis of the position of the stator flux space vector $\psi_S$ with respect to the rotor flux space vector $\psi_R$ is, of course, dependent on major changes in the handling and emission of the optimized pulse patterns in the triggering equipment 42.

Optimized pulse patterns are available as already calculated switching angles, which are calculated and stored as a function of the drive level and in discrete steps. The intermediate circuit voltage $U_D$ is in this case assumed to be constant for one sampling interval. The conversion of the nominal voltage to the drive level a for the instantaneous intermediate circuit voltage $U_D$ and of switching angles to switching times is carried out in the triggering equipment 42.

Figure 7:
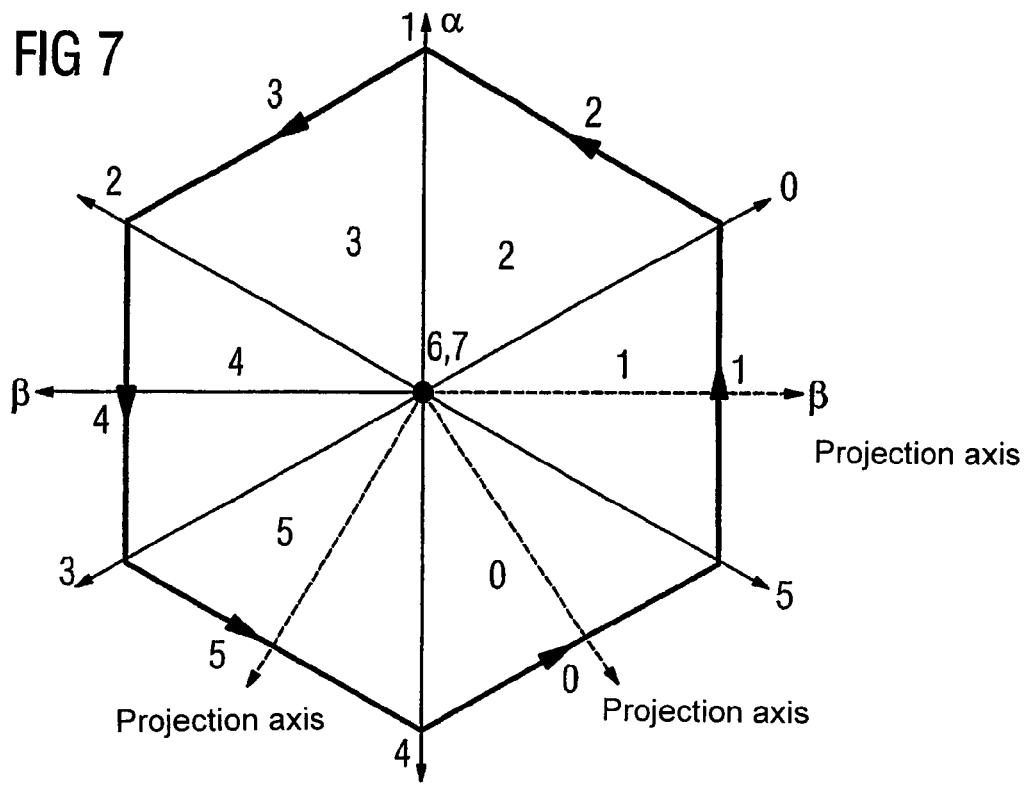
FIG. 7 shows the possible output voltages of a pulse inverter using a space vector coordinate system which is fixed to the stator.

For a two-point inverter, there are six voltage vectors $U_0, \ldots, U_5$ of length ⅔ $U_D$ and two zero vectors $U_6$, $U_7$ of length zero. These voltage vectors $U_0, \ldots, U_7$ are illustrated in a space vector coordinate system $\alpha$, $\beta$, which is fixed to the stator, in FIG. 7. If the voltage time integrals are considered as a flux (terminal flux), they can be described as vectors in the space vector system in the same way as the voltages $U_0, \ldots, U_7$. A terminal flux vector $\psi_K$ such as this moves at the velocity ⅔ $U_D$ per second in the direction of the voltage vector when one of the six voltage vectors $U_0, \ldots, U_5$ is connected, and remains stationary when the zero vector $U_6, U_7$ is connected. When the voltage vectors $U_0, \ldots, U_5$ are switched successively with fundamental clocking, this results in the terminal flux vector $\psi_K$ having a hexagonal profile.

The fundamental idea of the voltage time-integral triggering equipment 42 is to combine steady-state and dynamic initial control and error correction for the voltage time integrals, such that these are applied.

If the voltage time integrals and the terminal flux $\psi_K$ are at the steady-state value that is applicable for the instantaneous state, the variables that primarily need to be controlled are the torque and the stator current components, which are set exactly. One precondition is that the value can be produced in a steady state form with the maximum available voltage.

In the case of synchronous pulse patterns, the steady-state voltage including harmonics is initially controlled by the use of the flux triggering equipment other than in the case of asynchronous modulation, even though the control itself also produces only fundamental set point values, of course. The nominal flux curve for the triggering equipment is determined from the fundamental set point values of the control process, from which the switching operations are then determined in the triggering equipment on the basis of the instantaneous value, thus determining the harmonics.

While the nominal voltage is valid only in the steady state, the nominal flux band curve is valid both in the steady state and dynamically. This has made it possible for the dynamic initial control to be moved with the required differentiation, to the triggering equipment 42, which operates on a time-discrete basis. In this case, time discretization should be understood as meaning clocking by means of the synchronous pulse pattern.

The controlled readjustment of the nominal flux path curve automatically ensures the readjustment of the integration constant from the voltage to the flux, and equalization processes can no longer occur.

Instead of voltage vectors and switching angles, which are converted to the switching time, voltage vectors and terminal flux values (=voltage integrals) must now be predetermined in the pulse pattern tables for the triggering equipment 42. The flux set point values $\psi_{Knom}$ result in a switching threshold to be achieved, from which the switching time $T_{switch}$ is in each case recalculated using the instantaneous intermediate-circuit voltage $U_D$ and the previously achieved flux actual value $\psi_K$. All errors in the terminal flux $\psi_K$ are thus corrected on reaching the respective switching threshold. The control method for error correction thus has a dead-beat response.

Since the terminal flux $\psi_{Knom}$ is not directly suitable as a manipulated variable for torque application, because the voltage drops across the resistive stator impedance $R_S$ can be taken into account only in the steady state, only one quasi-steady-state terminal flux actual value $\psi_K$ may be used for correction, as well.

Figure 8:
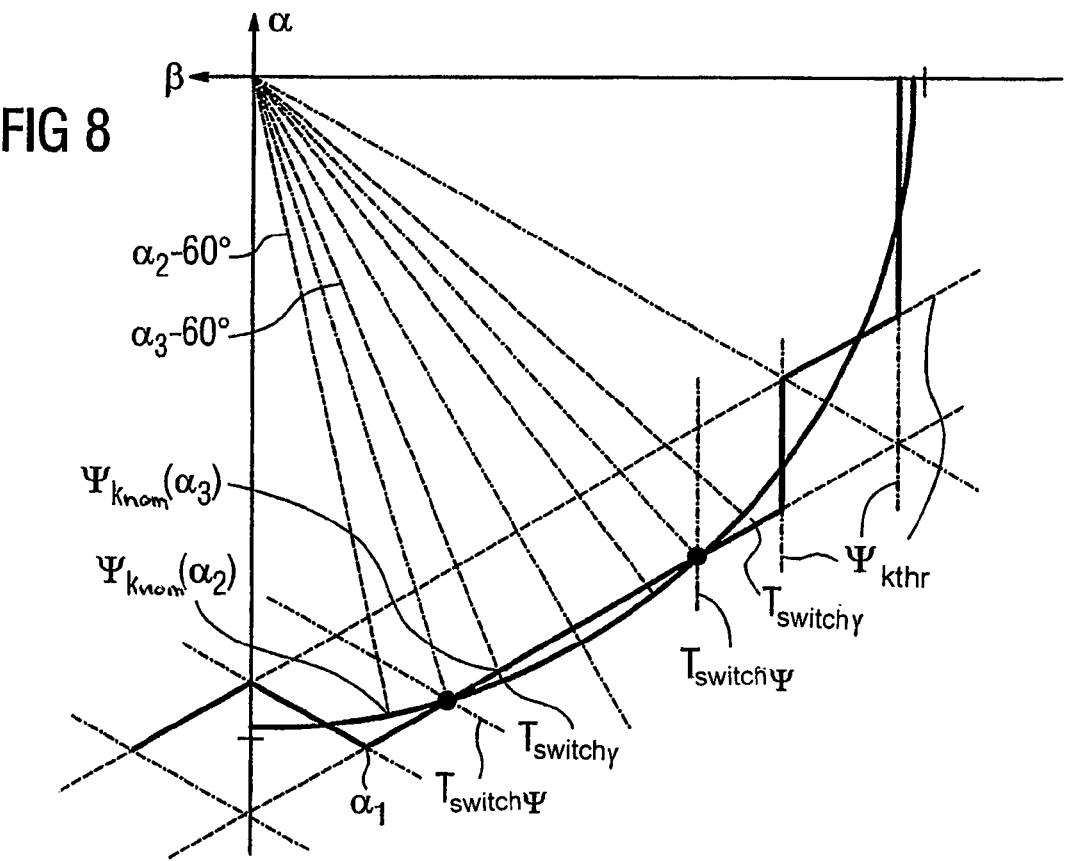
FIG. 8 shows a terminal flux profile in a stator with flux magnitude thresholds and angle thresholds.

The correction measures on the pulse patterns in order to comply with the predetermined terminal flux path curve lead, as can be seen from FIG. 8, to the following different switching thresholds.

Switching types:
1. "Corner" (change from one voltage vector to the other):
   Flux magnitude threshold: the projection axis is at right angles to the new vector, the switching threshold corresponds to the intersection of the new flux trajectory with the projection axis.
   Effect: the determination of the terminal flux actual value on the basis of the nominal stator currents also makes it possible to centre the stator flux actual value dynamically, and at the same time to compensate by initial control and to a very good approximation for the flux magnitude error resulting from the voltage drop across the stator resistance $R_S$. The flux is centered, and the flux magnitude error is corrected.
2. "Zero on" (change from a voltage vector to a zero vector, the next voltage vector is the same):
   The projection axis is at right angles to the previous (1st half sector) or next-but-one voltage vector (2nd half sector).
3. "Zero corner" (change from a voltage vector to a zero vector, the next voltage vector is another one):
   The projection axis is at right angles to the next voltage vector.
4. "Zero off" (change from the zero vector to a voltage vector):
   Flux angle threshold: the zero vector is disconnected and the next voltage vector is connected when the continuous nominal angle of the terminal flux is equal to the switching angle to the pulse pattern.
   Effect: since the actual flux space vector was stopped at the point on the flux trajectory predetermined by the pulse pattern on connection of the zero vector, when the nominal flux space vector reaches the disconnection nominal angle as the procedure continues, the nominal angle between the stator flux and the rotor flux space vector, and thus the torque, are set very precisely. Any angle error is compensated for as well as possible by the connection of the zero vector by means of the actual value, and disconnection on the basis of the set point value.

The pulses pattern tables thus comprise a sequence of these switching operations, with the type of switching operation, the switching state (voltage vector) and the projection axis being stored in addition to the value of the flux threshold.

Figure 9:
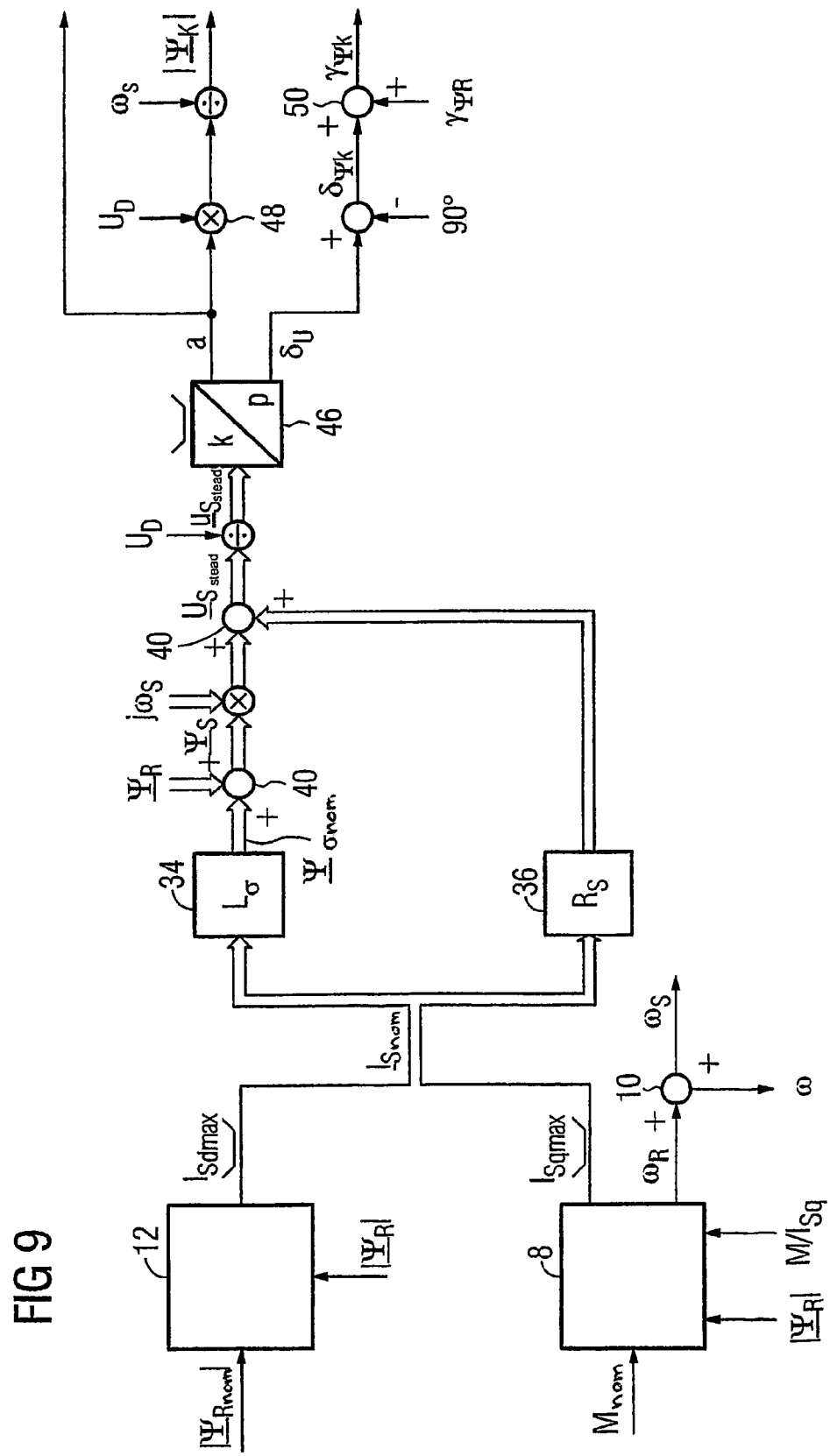
FIG. 9 shows the implementation of one advantageous method according to the invention.

FIG. 9 illustrates, schematically, the implementation of one advantageous method according to the invention. According to this illustration, a flux-forming current component $I_{Sdnom}$ is determined by means of a flux controller 12 from a predetermined rotor flux magnitude $|\psi_{Rnom}|$. A torque-forming current component $I_{Sqnom}$ is calculated from a torque set point value $M_{nom}$ by means of a torque controller 8 and using the rotor flux magnitude actual value $|\psi_R|$ determined from the motor model 14. In addition, a stator angular frequency $\omega_S$ (=angular velocity of the stator flux) which is subject to initial control, is valid in the steady state and is required for the pulse pattern selection and for prior calculations is determined using a calculated steady-state rotor slip frequency $\omega_R$. The magnitudes of these two current components $I_{Sdnom}$ and $I_{Sqnom}$ are in each case limited before they are multiplied using a device 34 and 36, as in the structure shown in FIG. 6. A stray flux set point value $\psi_\sigma$ is then produced at the output of the device 34 and is added to a rotor flux actual value $\psi_R$ so that a stator flux set point value $\psi_{Snom}$ is produced at the output of the adder 40. This stator flux set point value $\psi_{Snom}$ is multiplied by an imaginary stator angular frequency $\omega_S$, whose product is added by means of a further adder 40 to a voltage value that is produced at the output of the device 36. This results in a steady-state set point value of the stator voltage $\underline{U}_{Sstead}$. This set point value of the steady-state stator voltage value $\underline{U}_{Sstead}$ is normalized with respect to an intermediate-circuit voltage $U_D$. The orthogonal components of this normalized steady-state stator voltage $\underline{u}_{Sstead}$ are converted to polar components as the drive level a and the voltage angle $\delta_u$. A coordinate converter 46 is used for this purpose. The polar component comprising the drive level a is on the one hand used directly for addressing an angle table of optimized pulse patterns, and is used in a smoothed form for addressing a pulse pattern selection level, while on the other hand being used to determine a fundamental terminal flux magnitude $|\psi_K|$. For this purpose, the polar component drive level a is supplied to a multiplier 48. The intermediate-circuit voltage $U_D$ is applied to the second input of the multiplier 48, thus cancelling the normalization process. The value at the output of this multiplier 48 is then divided by the stator angular frequency $\omega_s$ to produce the fundamental terminal flux magnitude $|\psi_K|$.

An angle $\delta_{\psi K}$ (or $X_{nom}$) between the terminal flux $\psi_K$ and the rotor flux $\psi_R$ is determined by subtraction of 90° from the polar component comprising the voltage angle $\delta_U$ (angle between the voltage $\underline{U}_{Sstead}$ and the rotor flux $\psi_R$ as shown in FIG. 2). The continuous rotor flux angle $\gamma_{\psi R}$ of the motor model 14 is added to this angle $\delta_{\psi K}$ by means of a further adder 50, thus resulting in the continuous terminal flux nominal angle $\gamma_{\psi knom}$ for the voltage time-integral triggering equipment.

Figure 10:
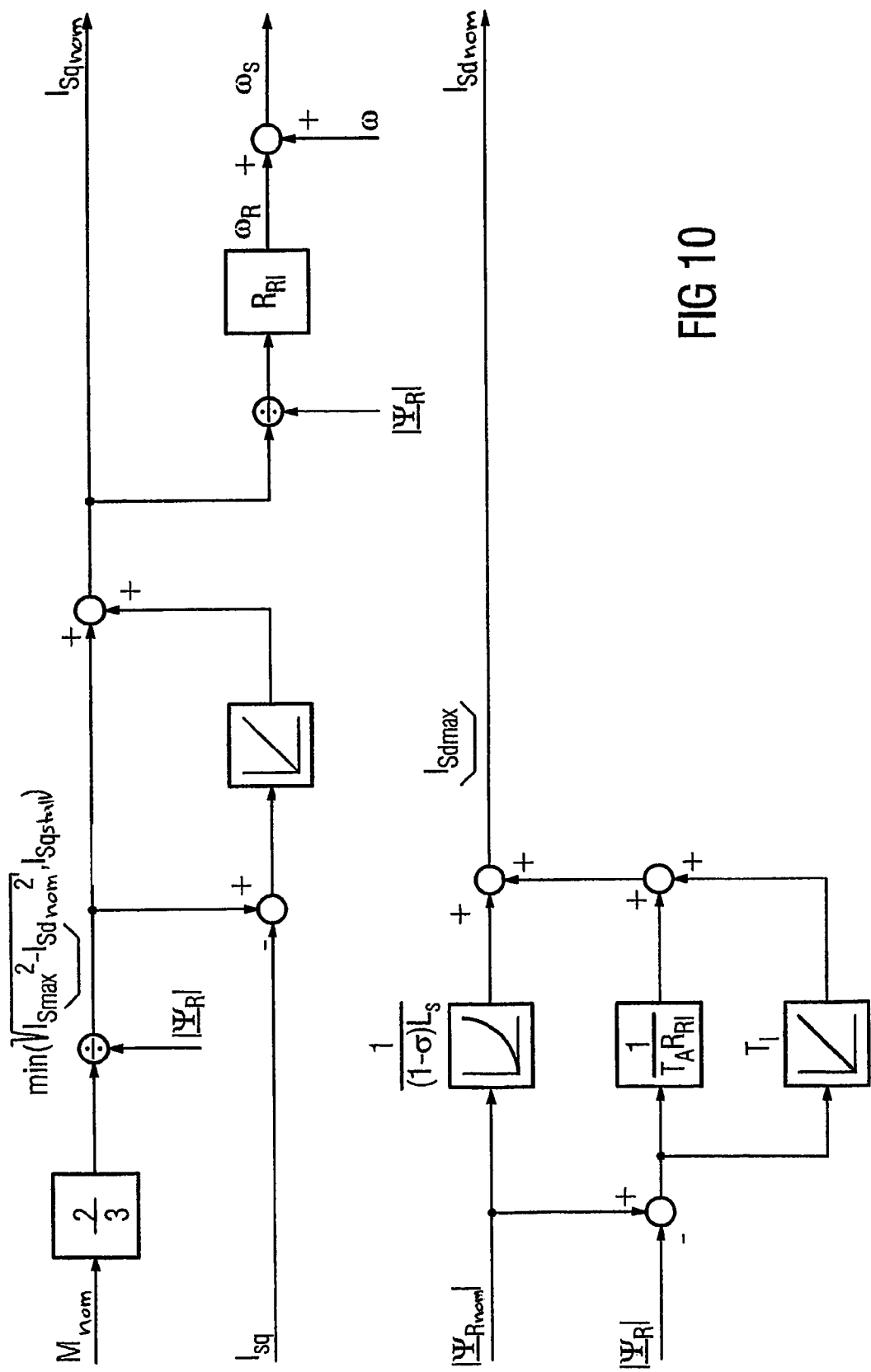
FIG. 10 shows an implementation of a flux and torque controller as shown in FIG. 9.
Figure 11:
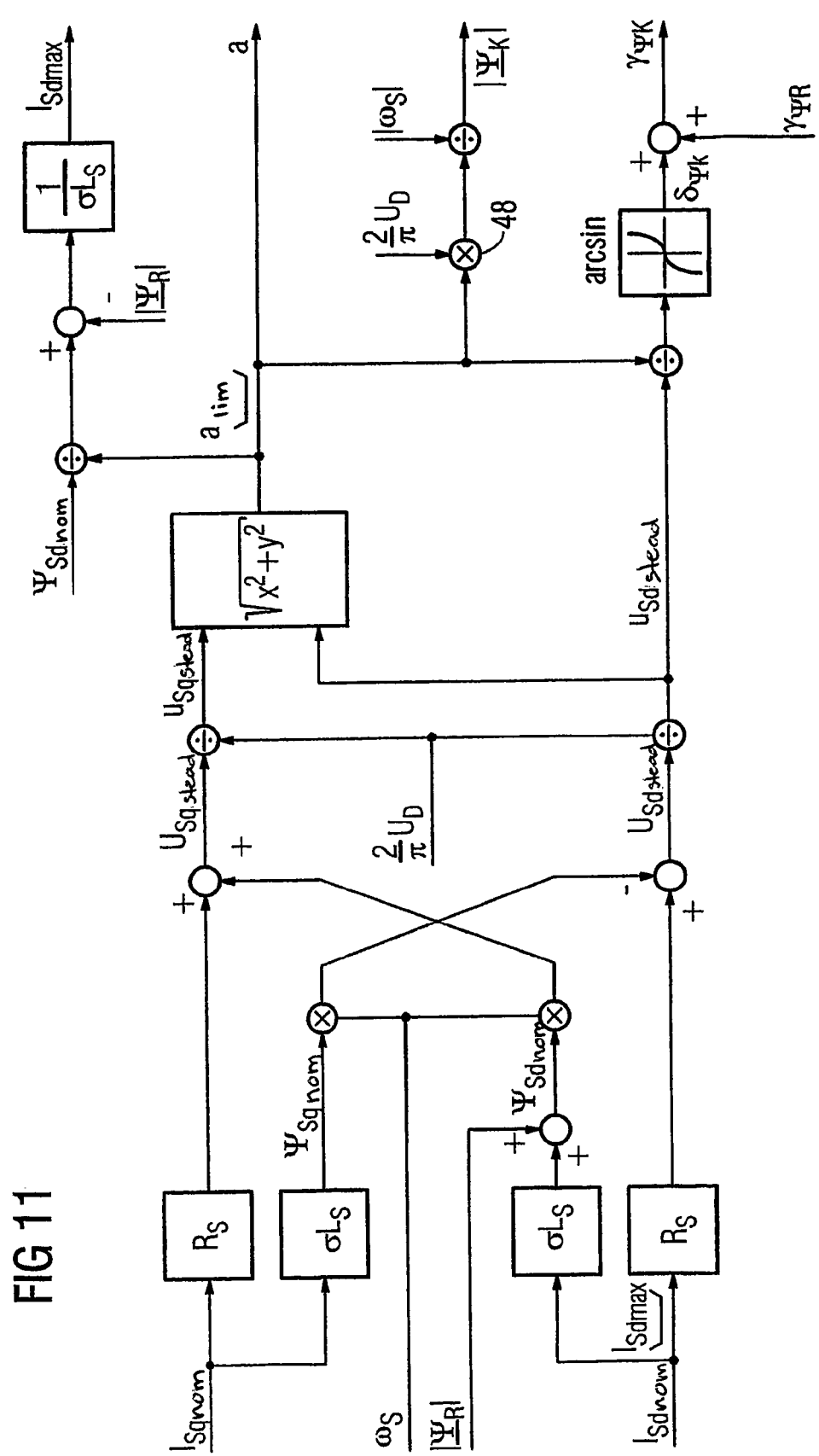
FIG. 11 shows an implementation of the initial control as shown in FIG. 9.

By way of example, FIG. 10 explicitly illustrates torque control 8 and flux control 12 while, in contrast, FIG. 11 illustrates subsequent steady-state and dynamic initial control.

The circuitous route via the calculation of the steady-state stator voltage $\underline{U}_{Sstead}$ results on the one hand in the drive level a being produced, while on the other hand this drive level a can be limited in the field weakening region. The drive level a is required for selection of a pulse pattern. This drive level a is used directly for addressing the angle table for the pulse pattern, and is used in a smooth form for addressing the pulse pattern selection plane U/f plane. In the case of the limiting of the drive level a in the field weakening region (FIG. 11), the voltage angle $\delta U$ must be calculated in such a way that the steady-state torque-forming voltage component $U_{Sdstead}$ (FIG. 11) still corresponds to its set point value. This voltage angle $\delta_U$ is calculated using the following equation:

$$\delta_u = \arcsin\frac{U_{Sdstead}}{a_{lim}} + 90° = \arcsin\frac{U_{Sdstead}}{a_{lim} \cdot \frac{2}{\pi} \cdot U_D} + 90°$$

As can be seen from FIG. 11, the set point value of the field-forming current component $I_{Sdnom}$ must be limited to the value which corresponds to the flux that can be produced in the instantaneous operating state, in order to calculate the resistive voltage drop across the stator impedance $R_S$ which acts on the channel of the torque-forming voltage component $U_{Sdstead}$. This is necessary in order to prevent there being a steady-state error in the initially controlled torque in the event of drive level limiting.

The resistive component of the stator impedance $R_S$ is irrelevant for the determination of the pulse patterns, since it is negligible for harmonics, in comparison to the stray reactance. This allows load-independent prior calculation of the pulse patterns, which are then used to determine the terminal flux path curve. However, the resistive component of the stator impedance $R_S$ cannot be ignored for the fundamental, by means of which the torque $M_{nom}$ is set. The voltage drop across it causes the difference between the terminal flux $\underline{\psi}_K$ and the stator flux $\underline{\psi}_S$.

Figure 12:
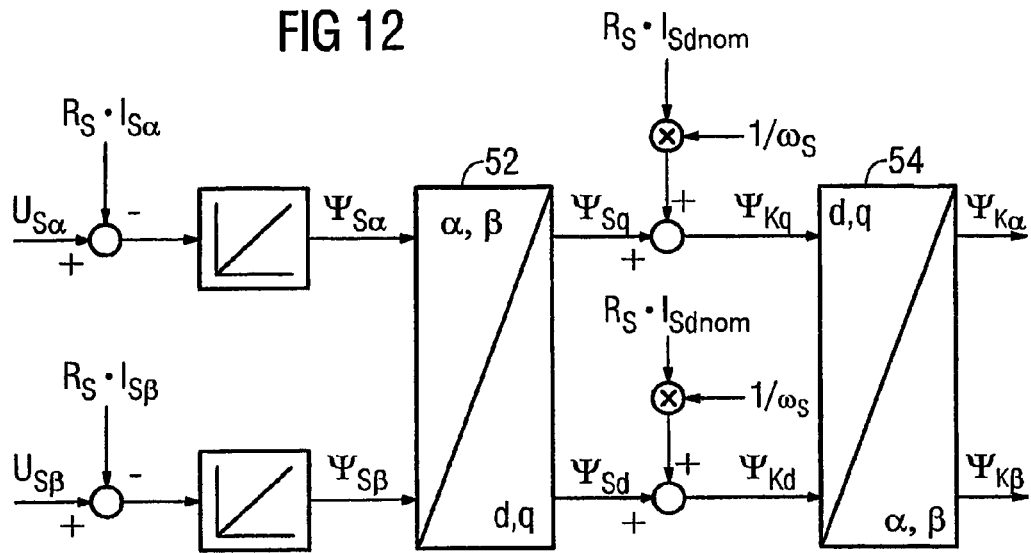
FIG. 12 shows a block diagram of a device for calculation of a terminal flux actual value, in more detail.

The assumption that the required steady state for synchronous pulse patterns can be achieved in particular in practice with each new switching state in the presence of zero vectors $U_6$, $U_7$ allows the steady-state voltage drops across the resistive component of the stator impedance $R_S$ to be used as the basis for the comparison of a terminal flux actual value $\underline{\psi}_K$ with selected flux magnitude thresholds $\psi_{Kthr}$, then corresponding to the current set point values, which are considered to be in the steady state. As shown in FIG. 12, in order to calculate the instantaneous terminal flux, the voltage drop across the resistive component of the stator impedance $R_S$ caused by the instantaneous stator current $\underline{I}_S$ must be subtracted before the integration of the stator voltage $U_S$, and thus the instantaneous stator flux value. The integration process is expediently carried out using coordinates $\alpha$, $\beta$, which are fixed to the stator, and the stator flux components $\psi_{S\alpha}$ and $\psi_{S\beta}$ are then rotated into the coordinate system d, q, which are synchronized to the rotor flux, by means of a coordinate rotator 52, in order that the steady-state terminal flux components $\psi_{Kq}$ and $\psi_{Kd}$ can be determined using the current set point values $I_{Sdnom}$ and $I_{Sqnom}$, which are in rotor coordinates. For further use of these terminal flux components $\psi_{Kq}$ and $\psi_{Kd}$, they are rotated back again to the coordinates $\psi_{K\alpha}$ and $\psi_{K\beta}$, which are fixed to the stator, by means of a further coordinate rotator 54. The terminal flux coordinates $\psi_{K\alpha}$ and $\psi_{K\beta}$ which are fixed with respect to the stator are then produced at the output of this coordinate rotator 54. Thus, to a good approximation, the stator flux $\underline{\psi}_S$ is applied dynamically instead of the terminal flux $\underline{\psi}_K$, and hence the stator current $\underline{I}_S$ and the torque M are thus applied directly. This avoids equalization processes resulting from the resistive component of the stator impedance $R_S$.

Figure 13:
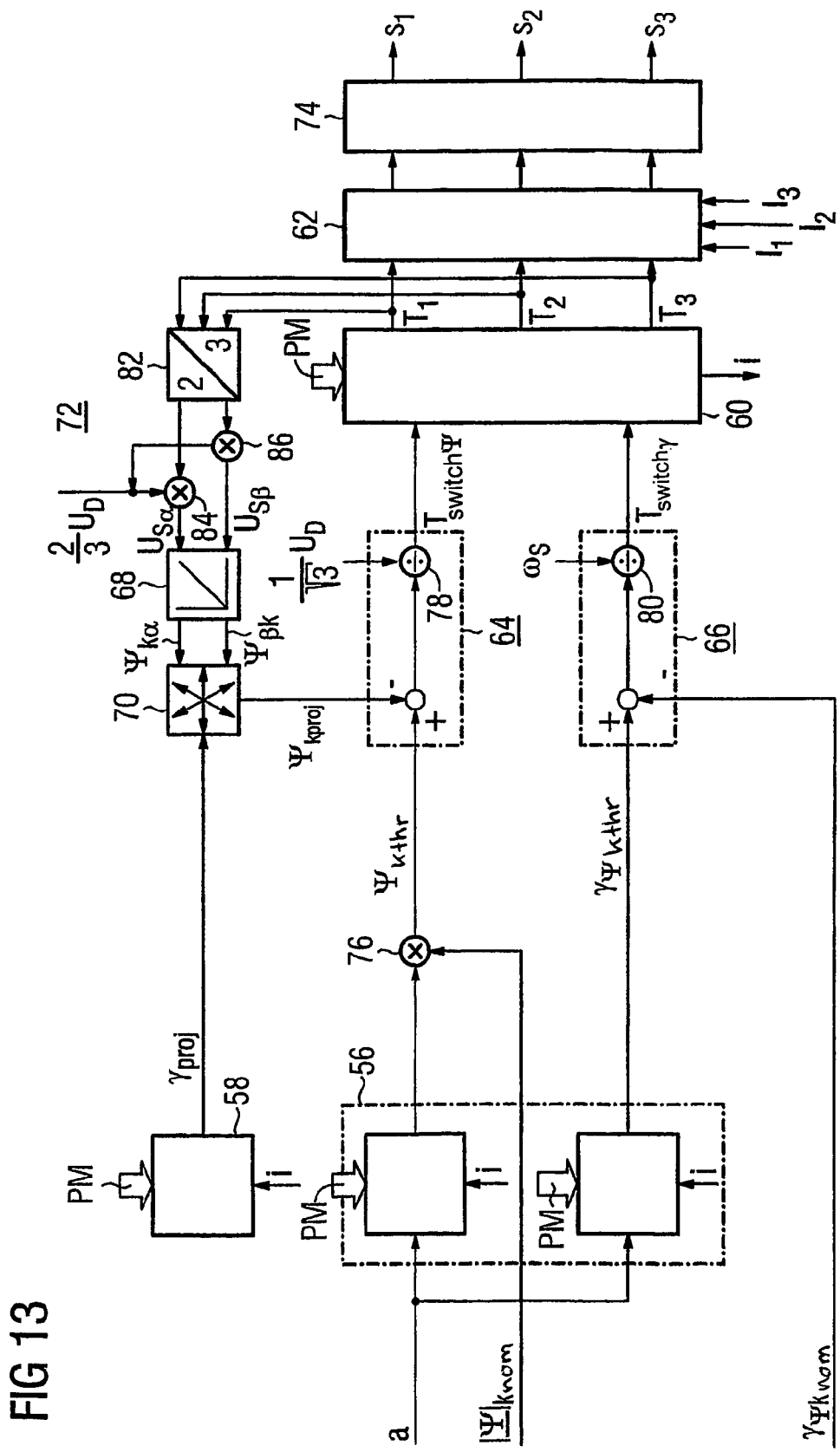
FIG. 13 shows the structure of voltage time-integral triggering equipment in the basis rotation speed range.
Figure 15:
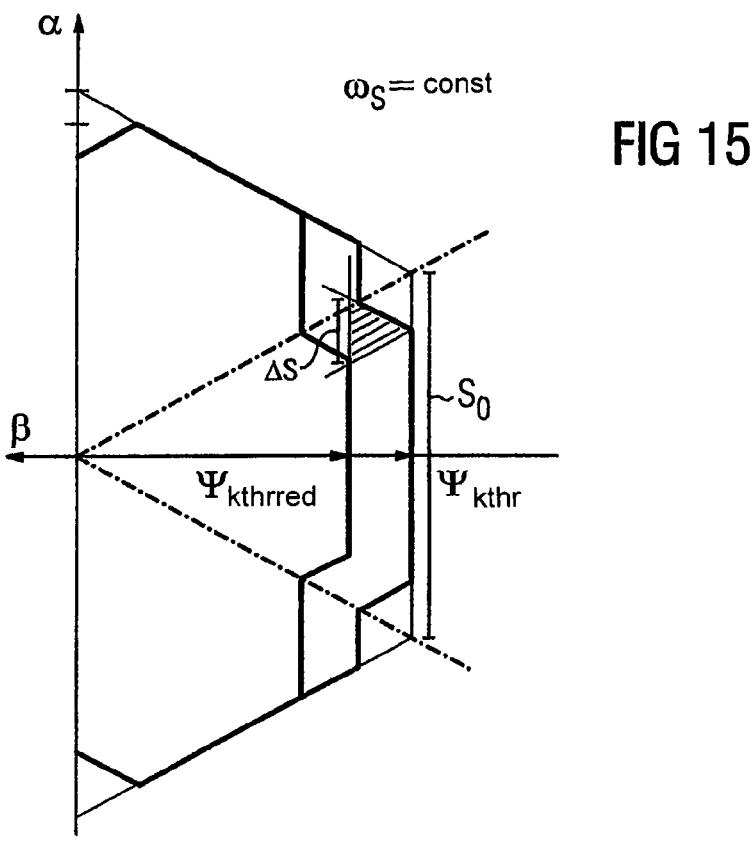
FIG. 15 illustrates the function of path curve shortening for a flank pulse pattern while, in contrast.

FIG. 13 illustrates the structure of voltage time-integral triggering equipment in the basic rotation speed range in more detail. In this structure, 56, 58 and 60 each denote a memory, 62 denotes a device for converter linearization, 64 denotes a device for calculation of switching times for flux magnitude thresholds, 66 denotes a device for calculation of switching times for flux angle thresholds, 68 denotes a device for determination of a terminal flux actual value $\underline{\psi}_K$, 70 denotes a sector projection device, 72 denotes a device for generation of voltage components $U_{S\alpha}$ and $U_{S\beta}$ of a stator voltage actual value $\underline{U}_S$ from switching states $T_1$, $T_2$ and $T_3$, and 74 denotes a switching timer. The pulse patterns PM which have been calculated off-line, are stored in the memories 56, 58 and 60, in which case a table with flux magnitude thresholds and a table with flux angle thresholds are stored in the memory 56. A table with projection axes is stored in the memory 58, and a table with switching states (voltage vectors) is stored in the memory 60.

A flux magnitude threshold which is normalized with respect to the rated flux and a corresponding flux angle threshold $\gamma_{\psi Kthr}$ is read from the memory 56 as a function of the polar component of the drive level a of the manipulated variable comprising the terminal flux set point value $\underline{\psi}_{Knom}$. This normalized flux magnitude threshold that is read is multiplied by means of a multiplier 76 by the polar components of the fundamental terminal flux magnitude $|\underline{\psi}_K|_{nom}$ of the manipulated variable comprising the terminal flux set point value $\underline{\psi}_{Knom}$. This results in a flux magnitude threshold $\psi_{Kthr}$ which corresponds to the drive level a. This flux magnitude threshold $\psi_{Kthr}$ is first of all compared in the device 64 with a projected terminal flux actual value $\psi_{Kproj}$, which is produced at the output of the sector projection device 70. The difference that is determined is supplied to a divider 78, to whose second input a value $1/\sqrt{3}\, U_D$, which corresponds to a path velocity, related to the projection axis, of the terminal flux $\underline{\psi}_K$. A corresponding switching time $T_{switch\psi}$ is produced at the output of this divider 78 and is supplied to an input of the memory 60 with the table of switching states. A zero vector $U_6$, $U_7$, a "corner" or a "zero corner" is connected by means of this switching time $T_{switch\psi}$.

The flux angle threshold $\gamma_{\psi Kthr}$ which has been read from the memory 56 is compared in the device 66 with the continuous terminal flux nominal angle $\gamma_{\psi Knom}$, whose difference is divided by the path velocity of the flux angle. The path velocity is proportional to the stator angular frequency $\omega_S$. A switching time $T_{switch\gamma}$ for disconnection of a zero vector is produced at the output of the divider 78, and is likewise supplied to a second input of the memory 60.

The next (i-th) switching state is read from the memory 62 as a function of these switching times $T_{switch\psi}$ and $T_{switch\gamma}$, and the switching time is assigned to the associated inverter phase. The resultant switching times T1, T2 and T3 are supplied to the device 62 for converter linearization, and to a coordinate converter 82 for the device 72 for generation of voltage components $U_{S\alpha}$ and $U_{S\beta}$ of a stator voltage set point value $\underline{U}_S$. The two outputs of this coordinate converter 82 are each connected to a multiplier 84 and 86, to each of whose second inputs the factor $\tfrac{2}{3} U_D$ is applied. A respective voltage component $U_{S\alpha}$ or $U_{S\beta}$ of a stator voltage nominal voltage $\underline{U}_S$ is produced at the outputs of these two multipliers 84 and 86. These voltage components $U_{S\alpha}$ and $U_{S\beta}$ are used to calculate terminal flux actual value components $\psi_{K\alpha}$ and $\psi_{K\beta}$, respectively, by means of the device 68, and FIG. 12 shows one exemplary embodiment of this device 68. The sector projection device 70 uses these two calculated terminal flux actual value components $\psi_{K\alpha}$ and $\psi_{K\beta}$ to produce a terminal flux actual value $\underline{\psi}_{Kproj}$ projected onto the zero sector.

Current-dependent voltage errors from the pulse converter 24 are also compensated for in the case of synchronous pulse patterns by means of the device 62. For this purpose, the device 62 is supplied with the converter output currents $I_1$, $I_2$ and $I_3$. The downstream switching timer 74 ensures that the previously calculated times are output exactly, thus ensuring correct steady-state response of the terminal flux triggering equipment, in the same way as voltage triggering equipment. Since, in some circumstances, the sequence of the switching states no longer corresponds to that predetermined by the pulse pattern after the converter linearization, counter hardware should be used in order to avoid software reorganization of the switching process, in which hardware the sequence of the output depends only on the loaded switching times and not on the sequence of loading.

If there are no zero vectors $U_6$, $U_7$, or they are too short, it is no longer possible to regulate an angle error or a dynamic voltage angle component by varying them. However, the angle influences mainly the torque, which can be set highly dynamically and independently of the flux at every operating point. As in the case of a full drive level, the torque initial control and control must in this case be dealt with with priority over flux initial control and control, with dynamic changing of the field-forming current component acting only in a highly attenuated manner on the rotor flux $\psi_R$, since the rotation time constant is long. However, one critical factor is that the field-forming current component $I_{Sdnom}$, which can no longer be influenced independently, is not significantly increased since, in this case, the current limiting which is important for the pulse-control inverter would no longer be effective.

The angle $\delta_{\psi K}$ of the terminal flux $\psi_{Knom}$ must for this purpose be influenced via the flux magnitude thresholds $\psi_{Kthr}$. A dynamic change to the flux magnitude thresholds $\psi_{Kthr}$ results in lengthening or shortening of the flux path curve which is passed over at a constant path velocity when the intermediate-circuit voltage $U_D$ is constant, and thus in a slower or faster revolution, so that the angle $\delta_{\psi K}$ of the terminal flux $\psi_{Knom}$ is changed with respect to the rotor flux $\psi_R$.

This path curve control operates in principle in the same way as dynamic field weakening in the case of asynchronous modulation, but in contrast to this can be initially controlled exactly when synchronous clocking is used, because the range of the path curve change by a sector is known by the definition of the pulse pattern for a sector.

This change to the control structure starts dynamically, because of the relationship with the zero vector $U_6$ or $U_7$, respectively, even before full drive for drive levels of 0.8 to 0.9, and then also acts in the steady state on reaching the drive limit, that is to say the field-forming current component $I_{Sdnom}$ and the rotor flux $\psi_R$ are also in the steady state and can no longer be influenced. In this case, steady-state initial control ensures the correct nominal angle.

Figure 14:
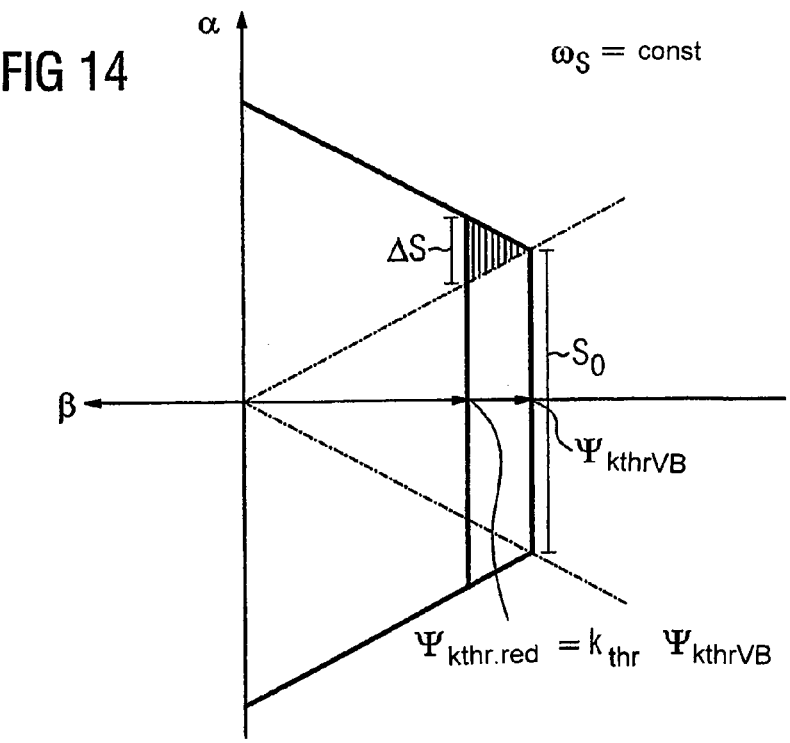
FIG. 14 illustrates the function of path curve shortening for a full block.
Figure 16:
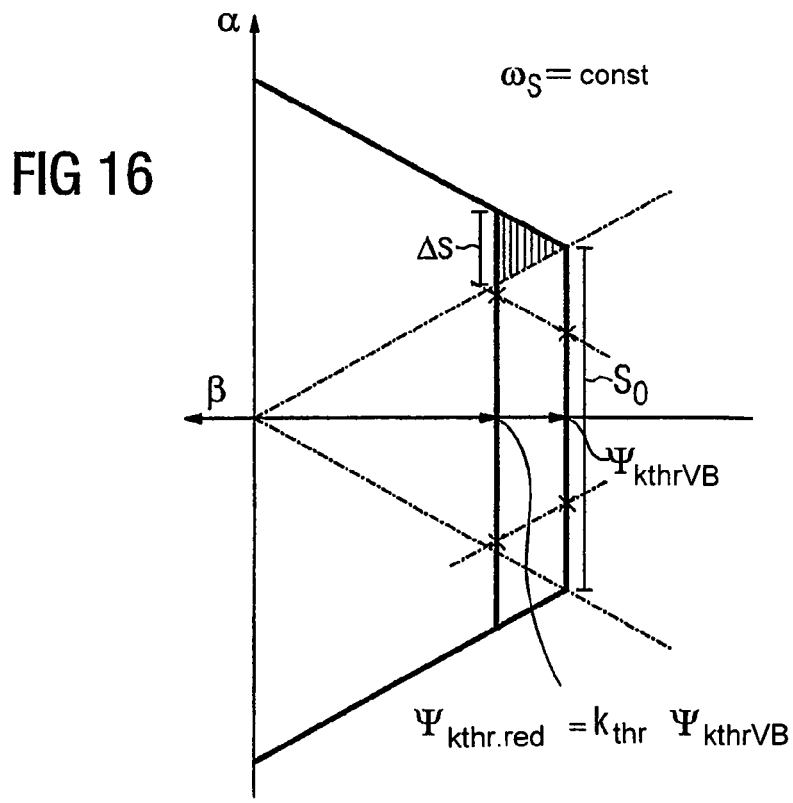
FIG. 16 shows the position of the zero vector for dynamic path curve shortening.

In order to vary the length of the flux path curve, the switching thresholds of the flux path curve are varied in the instantaneous sector, so that this curve is shifted parallel towards smaller or larger values. FIG. 14 shows path curve shortening for a full block, and FIG. 16 shows path curve shortening for a flank pulse pattern, for example a triple flank. As can be seen from the geometry, the path length change and, in a corresponding manner, the angle change, depend linearly on a threshold change. The required matching factor is given by:

$$K_{thr} = 1 - \frac{\Delta \delta_{\psi K}}{60°}$$

In FIG. 14, a reduced flux magnitude threshold $\psi_{Kthrred}$ is obtained using this matching factor $K_{thr}$ from a previously calculated flux magnitude threshold $\psi_{KthrVB}$, thus shortening the length $S_0$ of the path curve by $\Delta S$.

In the case of pulse patterns with switching operations on the flanks (corner inward folds), this results in the characteristic that the length $S_0$ of the path curve depends exclusively on the maximum flux threshold, and is independent of all below this. A simple proportional change to all the flux thresholds thus satisfies the equations quoted above. This function is thus independent of the pulse pattern.

Fundamentally, the dynamic path length change $\Delta S$ allow the terminal flux angle $\delta_{\psi K}$ to be rotated forwards and backwards with respect to the rotor flux $\psi_R$, corresponding to an increase (in the direction of driving) or a reduction (in the direction of braking) of the torque $M_{nom}$. However, it should be noted that the flux reduction during forward rotation results in a smaller field-forming current than in steady-state operation, but in a higher field-forming current on backward rotation, because of the flux increase. The angle $\delta_{\psi K}$ may therefore be rotated backward only to a very minor extent.

However, this does not represent a serious problem since major angle changes are required only when increasing the torque at the drive limit. When reducing the torque, the initial control requires a drive level of less than unity, which in the steady states leads to selection of a pulse pattern with zero vectors $U_6$, $U_7$. Zero voltage space vectors can be switched dynamically and asynchronously in this case. The number of permissible zero voltages per sector is in this case configurable.

If zero vectors $U_6$, $U_7$ occur in the transitional region to full drive but are in fact too short for the required angle changes, the angle compensation that can be achieved in this way must be taken into account in the zero voltages when path curve shortening is initiated, since this would otherwise result in overcompensation.

For this purpose, the flux magnitude thresholds $\psi_{Kthr}$ at which the zero vectors $U_6$, $U_7$ are connected are not multiplied by the matching factor $K_{thr}$, but are left unchanged. Since the connection thresholds for the zero vectors each have different projection axes in the first and second sector halves, this results, for the disconnection thresholds of the zero vectors with FIG. 16, in:

zero vector in the first sector half:
connection delayed by $\Delta s \approx \Delta_{\gamma \psi K}$, no correction of the disconnection angle
zero vector in the second sector half:
connection not delayed, connection angle delayed by $\Delta_{\gamma \psi K}$.

The control function is thus suppressed by the zero vectors and only the angle changes resulting from the path curve shortening are effective.

Figure 17:
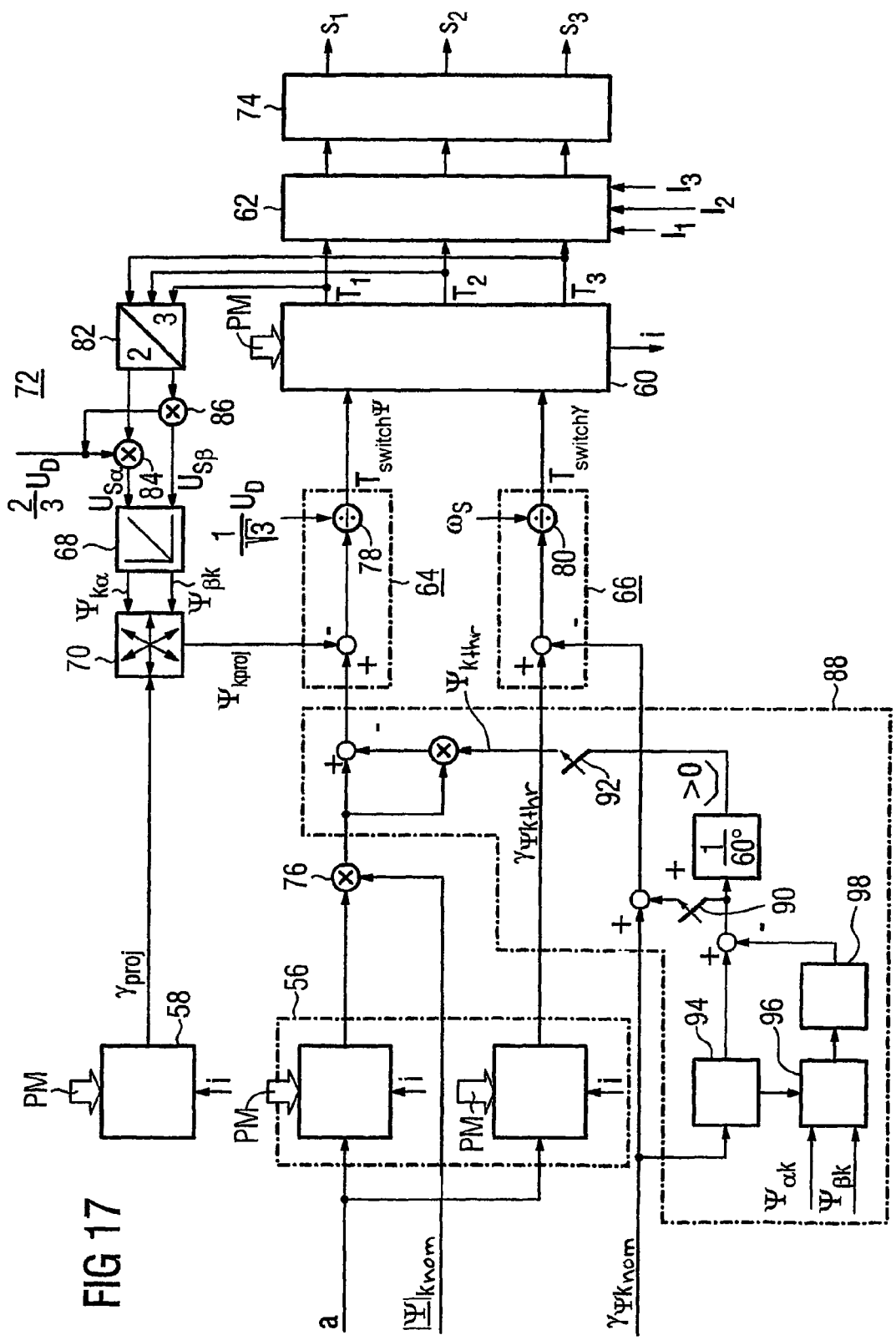
FIG. 17 shows the structure of voltage time-integral driven equipment in the basis rotation speed range and in the field weakening range.

FIG. 17 illustrates a structure for voltage time-integral triggering equipment, which differs from the structure shown in FIG. 13 only by having an additional device 88. This additional device 88 acts on the continuous terminal flux nominal angle $\gamma_{\psi Knom}$ and on the flux magnitude threshold $\psi_{Kthr}$ in a controlled manner. The action on the continuous terminal flux nominal angle $\gamma_{\psi Knom}$ takes place in the second sector half while, in contrast, the action on the flux magnitude threshold $\psi_{Kthr}$ takes place at a "corner". This additional device 88 has two switches 90 and 92 for this controlled influencing process. An angle difference of the angle of the terminal flux actual value $\psi_{K\alpha}$, $\psi_{K\beta}$ with respect to the nominal flux path curve is applied to the input of the switch 90. This difference value can be determined at the start and in the centre of each sector. The centre of each sector is identified by means of the device 94. The angle of a calculated terminal flux actual value $\psi_{K\alpha}$, $\psi_{K\beta}$ is calculated in advance by means of the devices 96 and 98.

The matching factor $K_{thr}$ is then determined from this angle difference and is used to modify the flux magnitude threshold $\psi_{Kthr}$ in addition to connection of zero vectors $U_6$, $U_7$. In the second sector half, the angle difference must also be added to the flux angle threshold $\gamma_{\psi Knom}$ in order to disconnect zero vectors.

This method according to the invention combines the high control dynamic response of direct switching methods with the optimum steady-state response of pulse patterns that have been optimized off-line.

The invention claimed is:
1. A method for applying a controlled stator current set point value and a controlled torque set point value to a converter-fed rotating-field machine, comprising:

computing a field-forming current component of the stator current set point value as a function of a predetermined rotor flux set point value and a measured actual rotor flux value;

computing a torque-forming current component of the stator current set point value as a function of a predetermined torque set point value, the measured actual rotor flux value and a measured torque-forming current component of a measured stator current;

determining an actual stator angular frequency value as a function of a measured rotor slip frequency and of an angular frequency;

by using a frequency-dependent stray inductance and a stator resistance as parameters, computing the integral the stator voltage as a manipulated variable from the computed values of the field-forming current component, the torque-forming current component, the actual stator angular frequency, and the measured rotor slip frequency; and deriving from the integral of the stator voltage a flux path curve which is selected from optimized flux path curves stored off-line.

2. The method of claim 1, further comprising the step of computing as a function of the computed field-forming current component and the torque-forming current component, of the parameters frequency-dependent stray inductance and the stator resistance, of the actual stator angular frequency, and of the actual rotor flux value a normalized steady-state stator voltage, which is normalized based on a measured intermediate circuit voltage.

3. The method of claim 1, wherein an actual terminal flux value is determined by before integrating the stator voltage, subtracting a voltage drop caused by the instantaneous stator current across the stator resistance, and after integrating the stator voltage and after transformation into a coordinate system, which is synchronized with the rotor flux, adding a voltage drop across the stator resistance caused by the set point value of the stator current, divided by the actual stator angular frequency.

4. The method of claim 2, and further computing from the normalized steady-state stator voltage in form of polar components a drive level and a voltage angle.

5. The method of claim 4, and further computing from the computed drive level a magnitude of a terminal flux at the computed fundamental actual stator angular frequency as a function of the measured intermediate circuit voltage using the following equation:

$$|\Psi_K| = \frac{a \cdot U_D \cdot \frac{2}{\pi}}{\omega_S}$$

wherein $\psi_K$ is the terminal flux, a is the computed drive level, $U_D$ is the intermediate circuit voltage, and $\omega_S$ is the stator angular frequency.

6. The method of claim 2, and further comprising the steps of determining a continuous rotor flux angle; determining an angle between the terminal flux and the rotor flux; computing from the determined continuous rotor flux angle and the determined angle between the terminal flux and the rotor flux a continuous nominal terminal flux angle using the following equation:

$$\gamma_{\Psi Knom} = \gamma_{\Psi R} + \delta_{\Psi K}$$

wherein $\gamma_{\psi Knom}$ is the continuous nominal terminal flux angle, $\gamma_{\psi R}$ is the rotor flux angle, and $\delta_{\psi K}$ is the angle between the terminal flux and the rotor flux.

7. The method of claim 4, wherein the polar voltage angle is computed using the following equation:

$$\delta_U = \arcsin \frac{U_{Sdstead}}{a \cdot U_D \cdot 2/\pi} + 90°$$

wherein $\delta_U$ is the polar voltage angle, $U_{Sdstead}$ is the torque-forming component of the normalized steady-state stator voltage, a is the computed drive level, and $U_D$ is the intermediate circuit voltage.

8. The method of claim 3, wherein the angle between a terminal flux and the rotor flux is computed using the following equation:

$$\delta_{\psi K} = \delta_u - 90° = \arcsin \frac{U_{sdstead}}{a \cdot U_D \cdot 2/\pi}$$

wherein $\delta_{\psi K}$ is the angle between the terminal flux and the rotor flux, $\delta_U$ is the polar voltage angle, $U_{Sdstead}$ is the torque-forming component of the normalized steady-state stator voltage, a is the computed drive level, and $U_D$ is the intermediate circuit voltage.

* * * * *